July 28, 1953     B. WALKER     2,647,011
TIRE MOUNTING UNDER HOOD ACCESSIBLE THROUGH DOOR OPENING
Original Filed Oct. 23, 1946
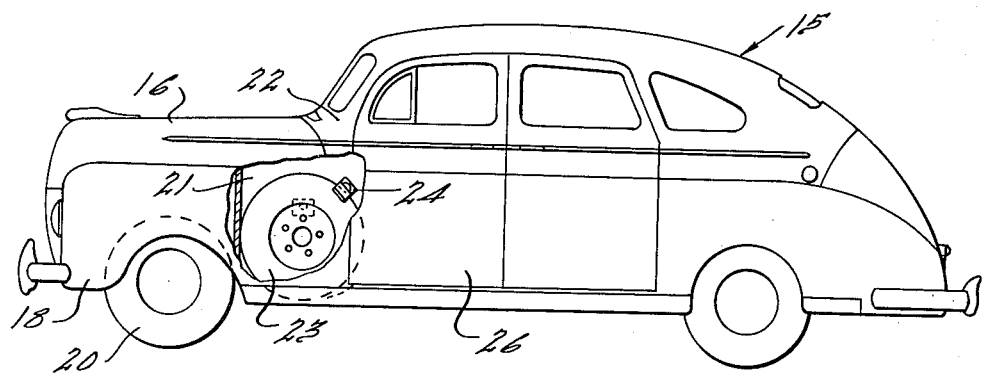
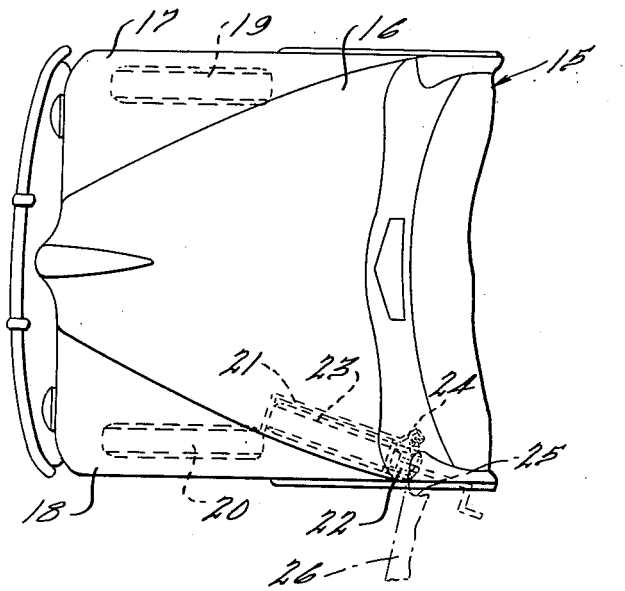
INVENTOR.
Brooks Walker.
BY
Barnes, Dickey & Pierce,
ATTORNEYS.

Patented July 28, 1953

2,647,011

UNITED STATES PATENT OFFICE 2,647,011

TIRE MOUNTING UNDER HOOD ACCESSIBLE THROUGH DOOR OPENING

Brooks Walker, Piedmont, Calif.

Original application October 23, 1946, Serial No. 705,089. Divided and this application July 6, 1949, Serial No. 103,292

3 Claims. (Cl. 296—37.2)

This invention relates to automobiles, and particularly to compartments therein for the reception and storage of tires or other articles, and is a division of my copending application, Serial No. 705,089, filed October 23, 1946, now Patent No. 2,563,981, for improvements in Automotive Vehicle Gas Tank and Tire Mounting.

It has been the practice in the past to support spare tires on the interior of the rear trunk compartment, to the rear of the compartment and under the floor of the compartment. When the tire is mounted within the compartment, the area available for the storage of luggage and like articles was substantially reduced.

The present invention has for its main object the disposition of the spare tire in a compartment beneath the hood communicating through an opening in the front door pillar through which the tire may be removed.

Another object of the invention is to provide a compartment under the hood which is in communication through an aperture in the front door pillar, the tire being removable from the compartment through the aperture when the front door is open or directly from the compartment when the hood is raised.

A still further object of the invention is to provide a compartment which is accessible through an opening in a front door pillar and which is closed by the front rail of the door when the door is in closed position.

Other objects and features of novelty of the invention will be specifically pointed out or will become apparent when referring, for a better understanding of the invention, to the following description taken in conjunction with the accompanying drawing, wherein:

Figure 1 is a broken plan view of an automobile body having a spare tire mounted thereon in a manner embodying features of this invention, and Fig. 2 is a broken plan view of the structure illustrated in Fig. 1, with the open position of the door illustrated in dot and dash line.

Referring to Figs. 1 and 2, an automobile 15 is illustrated of conventional form, having a hood 16 and fenders 17 and 18 on either side of the hood extending over front wheels 19 and 20. Beneath the hood 16 a compartment 21 is secured within the engine compartment forwardly of the front pillar 22. The compartment 21 communicates with a vertical opening in the pillar through which a tire or spare wheel 23 may be rolled or otherwise disposed within the compartment 23. The tire or wheel may be locked in position by a bracket 24 which is accessible through the opening in the pillar when the door is open. The compartment 21 may be of such length forward of the pillar that the rear portion of the tire extends beyond the opening, in which case a recess 25 may be provided in the forward rail of the door for enclosing the protruding portion thereof. When the door 26 is closed, the tire is securely locked in position by the rail portion 25 thereof extending over the opening in the pillar, the tire being immediately rendered available when the door is open.

It is to be understood that the compartment 21 may be entirely enclosed at the top to render the tire inaccessible when the hood is raised, or the compartment at the top may be open so that the tire or wheel may be removable from the compartment when the hood is raised and the door is maintained closed.

It is to be further understood that the compartment 21, herein specifically illustrated as supporting the spare tire or wheel, may be utilized as a tool box, luggage compartment or a storage space for any articles. The walls forming the compartment may be extended adjacent to the inside surface of the hood to which it is retained out of contact by suitable flexible material, such as rubber, felt and the like, which may be applied to the upper edge of the walls or which is secured to the inner surface of the hood. The flexible material prevents squeaks and noises occurring between the walls and the hood and forms a seal for the compartment.

What is claimed is:

1. In a vehicle body having front doors and a hood, a cooperating pillar and rail at the front of the body and door edge respectively, the pillar having an opening therein sufficient for the passage of a tire therethrough communicating with a compartment forwardly of said door and at least partially beneath the hood for the reception of a spare tire, said rail of the door having a recess in which a portion of the tire projecting rearwardly through the pillar of the body is recessed when the door is closed.

2. In a vehicle body having front doors and a hood, a cooperating pillar and rail at the front of the body and door edge respectively, the pillar having an opening therein sufficient for the passage of a tire therethrough communicating with a space for carrying a spare tire forwardly of said door and at least partially beneath said hood, said door having a recess in which a portion of the tire projecting rearwardly through the pillar of the body is recessed when the door is closed, and means for securing the spare tire in fixed position within the space.

3. In a vehicle body having front doors and a hood, a cooperating pillar and rail at the front of the body and door edge respectively, the pillar having an opening therein between its inner and outer edges sufficient for the passage of a tire therethrough, and a compartment forwardly of said door and at least partially beneath the hood for the reception of a spare tire, said door having a rail matable with said pillar for engaging the tire in the opening of the pillar and for closing said opening when the door is closed.

BROOKS WALKER.

References Cited in the file of this patent

UNITED STATES PATENTS

| Number | Name | Date |
|---|---|---|
| 1,289,871 | Mueller | Dec. 31, 1918 |
| 1,988,346 | Wagner | Jan. 15, 1935 |
| 2,028,184 | Bergholt | Jan. 21, 1936 |
| 2,474,985 | Rivard et al. | July 5, 1949 |
| 2,588,643 | Maxwell | Mar. 11, 1952 |

FOREIGN PATENTS

| Number | Country | Date |
|---|---|---|
| 731,787 | France | May 31, 1932 |